(12) United States Patent
Ludwig

(10) Patent No.: US 12,041,945 B2
(45) Date of Patent: *Jul. 23, 2024

(54) METHOD OF PRODUCING A VINEGAR-DERIVED FOOD ADDITIVE

(71) Applicant: WTI, INC., Jefferson, GA (US)

(72) Inventor: Wolf Peter Ludwig, Jefferson, GA (US)

(73) Assignee: WTI, INC., Jefferson, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,686

(22) Filed: Nov. 21, 2023

(65) Prior Publication Data

US 2024/0081356 A1 Mar. 14, 2024

Related U.S. Application Data

(63) Continuation of application No. 18/200,756, filed on May 23, 2023, which is a continuation of application No. 16/275,987, filed on Feb. 14, 2019, now Pat. No. 11,696,587, which is a continuation of application No. 12/794,332, filed on Jun. 4, 2010, now abandoned.

(60) Provisional application No. 61/184,105, filed on Jun. 4, 2009.

(51) Int. Cl.
| | |
|---|---|
| *A23L 27/24* | (2016.01) |
| *A23B 4/027* | (2006.01) |
| *A23B 4/12* | (2006.01) |
| *A23B 4/20* | (2006.01) |
| *A23B 4/24* | (2006.01) |
| *A23L 3/3472* | (2006.01) |
| *A23L 3/3508* | (2006.01) |
| *A23L 27/00* | (2016.01) |
| *A23P 10/40* | (2016.01) |

(52) U.S. Cl.
CPC ............... *A23B 4/027* (2013.01); *A23B 4/12* (2013.01); *A23B 4/20* (2013.01); *A23B 4/24* (2013.01); *A23L 3/3472* (2013.01); *A23L 3/3508* (2013.01); *A23L 27/24* (2016.08); *A23L 27/82* (2016.08); *A23P 10/40* (2016.08); *A23V 2002/00* (2013.01); *Y02A 40/90* (2018.01)

(58) Field of Classification Search
CPC .. A23B 4/20; A23B 4/027; A23B 4/24; A23L 13/72; A23L 27/82
See application file for complete search history.

(56) References Cited

U.S. PATENT DOCUMENTS

| | | |
|---|---|---|
| 6,217,925 B1 | 4/2001 | Kim |
| 6,689,403 B1 | 2/2004 | Gehring et al. |
| 11,696,587 B2 | 7/2023 | Ludwig |
| 2004/0166229 A1 | 8/2004 | Ludwig |
| 2007/0059423 A1 | 3/2007 | Toledo |
| 2008/0305213 A1 | 12/2008 | Husgen et al. |

OTHER PUBLICATIONS

Bacus, J., "Navigating the Processed Meats Labeling Maze" Food Technology, pp. 28-32 {Nov. 2007).
Fischer, et al. "Umrotung von Briihwurst ohne Nitritpokelsalz" Fleischwirtschafl, vol. 85(4), pp. 110-115(2005).
Sebranek, J. and Bacus, J. "Cured Meat Products Without Direct Addition of Nitrate or Nitrite: What are the Issues" Meat Science, v. 77, pp. 136-147 (2007).
Sebranek, J. and Bacus, J. "Natural and Organic Cured Meat Products: Regulatory, Manufacturing, Marketing, Quality and Safety Issues" American Meat Sci. Assoc. White Paper Series, No. 1, pp. 1-15 {Mar. 2007).
Sindelar et al. "Effects of Vegetable Juice Powder Concentration and Storage Time on Some Chemical and Sensory Quality Attributes of Uncured, Emulsified Cooked Sausages" J. Food Science, 72:S324 (2007).
Sindelar et al. "Investigating Quality Attributes and Consumer Acceptance of Uncured No-Nitrate/Nitrite-Added Commercial Hams, Bacons, and Frankfurters" J. Food Science, 72:S551 (2007).
Non-Final Office Action from corresponding U.S. Appl. No. 18/200,756 mailed Dec. 18, 2023, all enclosed pages cited.

*Primary Examiner* — Vera Stulii
(74) *Attorney, Agent, or Firm* — F. Brent Nix, Esq.; Johnson, Marcou, Isaacs & Nix, LLC

(57) ABSTRACT

A method of processing is disclosed that provides improved water retention and enhanced coloring and flavor, while preserving the meat and preventing bacterial contamination. In an exemplary embodiment, the method includes: (a) providing a body of meat at a first temperature; (b) contacting the body of meat of step (a), in at least one treating vessel, with a brine solution at a second temperature, wherein the second temperature is greater than the first temperature, and wherein the brine solution comprises a vinegar-derived food additive and/or a reddening agent, wherein the reddening agent comprises nitrite; (c) agitating the body of meat at the second temperature for a time sufficient to distribute the solution throughout the body of meat; (d) cooling the body of meat in at least one cooling vessel to a third temperature, wherein the third temperature is less than the second temperature; (e) agitating the body of meat at the third temperature; (f) contacting the body of meat of step (e) with the brine solution at the third temperature and agitating the body of meat at the third temperature until the brine solution is substantially absorbed by the body of meat; and (g) recovering the body of meat in a dry state at the third temperature.

In one embodiment, the aforementioned brine solution comprises a vinegar-variety food additive, such as a vinegar-derived acetate composition. In another embodiment, the reddening agent comprises nitrate derived from plant material comprising nitrate.

30 Claims, No Drawings

METHOD OF PRODUCING A VINEGAR-DERIVED FOOD ADDITIVE

RELATED APPLICATIONS/INCORPORATION BY REFERENCE

This application is a continuation of U.S. application Ser. No. 18/200,756 filed May 23, 2023, which is a continuation of U.S. application Ser. No. 16/275,987 filed Feb. 14, 2019, which is a continuation of U.S. application Ser. No. 12/794,332, filed Jun. 4, 2010, which claims priority to and the benefit of U.S. provisional patent application Ser. No. 61/184,105, filed on Jun. 4, 2009, now expired. The contents of the above-identified applications are hereby fully incorporated herein by reference.

TECHNICAL FIELD

The present disclosure relates to a method of processing meat to improve water retention and consistently provide enhanced coloring and flavor, while preserving the meat and preventing bacterial contamination.

BACKGROUND

Processing meat for consumer consumption requires careful attention to producing the correct flavor and color, without negatively affecting taste, while ensuring preservation of the meat by preventing bacterial growth. Consumers evaluate meat by its aesthetic appeal based on at least four factors, including color, juiciness, flavor, and tenderness. Color is the first factor noticed by consumers and is therefore thought to be the most important in their decision to purchase. The color of fresh meat ranges with the source of the meat, as well as its treatment. For example, freshly cut beef is a deep red with a purple tint, while chicken is pink.

The color of meat destined for consumer purchase is largely determined by the manner in which it is cured. Curing mixtures employed for curing meat may include ingredients such as salt, nitrite, nitrate (certain types of meats), reductants, phosphates, seasonings, binders, fillers, extenders, gelling agents, and smoke. Most ingredients used for curing are restricted by food regulatory agencies.

Salt is an important ingredient to most curing mixtures. It helps preserve against microorganisms on a limited basis, as well as develop flavor and help solubilize proteins which are important for the emulsion stability of comminuted meat products. Even at the highest levels of salt content in meat, complete bacteriostatic action is lacking. Accordingly, other preservation techniques are necessary in addition to salt.

Phosphates also aid in solubilizing proteins and therefore improve binding of comminuted and restructured-type meat products. In addition, phosphate usage in cures may increase pH, ionic strength, moisture retention (juiciness), assist in slowing the development of oxidative rancidity, and improve color and tenderness. Certain phosphates may also be added to decrease pH and speed up cure development.

Sweeteners may be added to meat products in order to add flavor, lower water activity, assist in browning reactions during thermal processing, and help moderate the astringency of salt in certain products. Extenders, finders, and fillers are nonmeat ingredients which may be added into meat products to improve meat batter stability, water binding capacity, texture and flavor, reduce shrinkage during thermal processing, and improve slicing characteristics.

Of all the ingredients which make up a curing mixture, nitrite is considered by some to be the most important. Nitrite is responsible for the typical color and flavor associated with cooked cured meat. It acts as an antioxidant and slows the formation of *Clostridium botulinum* toxin. However, addition of sodium nitrite to meat products is highly regulated by food regulatory agencies.

Fresh meat's color is largely impacted by the concentration and chemical nature of its hemoproteins, especially myoglobin, and the temperature/pH conditions of the post-slaughtered muscle. Myoglobin is the native pigment in muscle tissue, and in living tissue, myoglobin serves to store oxygen used in the normal biochemical processes of the muscle. Myoglobin levels are influenced by many factors related to muscle function. Consequently, the myoglobin concentrations vary greatly in various muscles of an animal. For instance, the less used muscle will likely have a lower oxygen requirement than, say, a muscle designed for movement. The overall redness of fresh meat is influenced by the concentration of myoglobin and, to a lesser extent, hemoglobin. A greater concentration of myoglobin typically results in a more intensely colored meat product.

Myoglobin is a globular protein consisting of a single polypeptide chain (globin), which is made up of amino acids and a prosthetic heme group, an iron(II) protoporphyrin-IX complex. The globin is folded around the iron of the heme group. While the structure of globin is stable over a wide range of conditions, it can be disrupted by drastic changes in physical or chemical environments in a process known as denaturation. Denaturation directly influences structural and functional aspects of the protein. The heme group is held in a cleft of the globin, and it is this group which gives myoglobin and its derivatives their distinct color. As such, it is the principal site for meat curing as it relates to color development.

In cured meats, muscle pigments cause a reflectance of light characteristic of the color of cured meat. Nitrite acts to stabilize myoglobin through a chemical bond in the same manner that the muscle pigment is stabilized by molecular oxygen in a live animal system or oxygenated postmortem meat system. In this respect, nitrites fix color rather than impart color.

The distinction between chemical and natural additives is becoming increasingly important within the industry. Consumers are becoming more aware of the foods they eat and the additives which are included in those foods. As a result, sales of foods labeled "natural" are increasing and predicted to continue increasing with increasing consumer awareness. Consequently, food manufacturers are looking to naturally derived products as food additives in order to maintain an "all-natural" label.

Food additives are defined by the Food and Drug Administration as any substance used to provide a technical effect in foods. Due to increased production of prepared and processed foods, the use of food additives has become more widespread in recent years. Before a food additive may be added to food, its safety is assessed by the Food Safety and Inspection Service (FSIS) of the U.S. Department of Agriculture (USDA).

When a food additive is proposed for use in meat, poultry, or egg products, its safety, its technical function, and its conditions of use are evaluated by the Labeling and Consumer Protection Staff of the FSIS, per the Federal Meat Inspection Act, Poultry Products Inspection Act, Egg Products Inspection Act, and other related regulations. The FSIS has established a list of food additives which it considers as safe and suitable ingredients. Even if food additives are considered as safe by the FSIS, there is a distinction between chemical additives and those which are considered "natural".

A product containing no artificial ingredient or added color and is only minimally processed (a process which does not fundamentally alter the raw product) may be labeled as "natural". The label must explain the use of the term "natural". When food additives are produced or derived other than naturally and subsequently added to food, they must be declared as such. For instance, if acetic acid, found naturally in vinegar, is added to a food, it must be declared as acetic acid on the label. However, if the acetic acid is derived from vinegar, it may be listed on the label as "vinegar" modified by source, rather than the chemical name.

The FSIS lists certain additives, such as sodium acetate and potassium acetate, as a safe and suitable ingredient for use in foods. In the industry, various acetates are commonly used as a buffers in controlling the pH of food items during various stages of processing as well as for the finished consumable product. Acetates are also considered as excellent agents for buffering mineral acids, as well as cosmetics. Used in conjunction, certain mixtures of acetates may act as a flavor enhancers. Furthermore, various acetates may be used as an antimicrobial agents to increase the shelf-life of meats, fishes, and poultry.

Increasing consumer interest in natural, organic, preservative-free, and healthy foods have increased demand for the availability of uncured, no-nitrate/nitrite-added meat and poultry products. To manufacture cured products without the direct addition of sodium nitrite, a nitrate source and reducer may be utilized. For instance, vegetables are known sources of nitrate. However, nitrate itself is not a highly reactive species for curing reactions and so must be reduced to nitrite to be used in curing reactions. Nitrate-to-nitrite reduction can be accomplished by microorganisms having nitrate reducing properties.

Within the industry, there is a need for processing meat via the most natural means possible, while maintaining the flavor, color, texture, and preserving the meat from bacterial deterioration. Furthermore, the known methods for processing meat present several problems. For example, the number and sensitivity of the steps involved in such processes leads to variable processing of the meat, resulting in an inconsistent product.

The following patents and patent applications are incorporated herein by reference: US Pat. Publication No. 2008/0305213; U.S. Pat. Nos. 6,217,925; 6,689,403; Sebranek et al. "Natural and Organic Cured Meat Products: Regulatory, Manufacturing, Marketing, Quality and Safety Issues" *American Meat Science Association White Paper Series* (2007); Sindelar et al. "Effects of Vegetable Juice Powder Concentration and Storage Time on Some Chemical and Sensory Quality Attributes of Uncured, Emulsified Cooked Sausages" *J. Food Science,* 72:S324 (2007); Sindelar et al., "Investigating Quality Attributes and Consumer Acceptance of Uncured No-Nitrate/Nitrite-Added Commercial Hams, Bacons, and Frankfurters" *J. Food Science,* 72:S551 (2007), Fischer, et al. "Umrotung von Brühwurst ohne Nitritpökelsalz" Fleischwirtschaft, vol. 85(4), pp. 110-115(2005).

SUMMARY

The present disclosure addresses the aforementioned needs. In an exemplary embodiment, a method is provided for the processing of meat, which method comprises: (a) providing a body of meat at a first temperature; (b) contacting the body of meat of step (a), in at least one treating vessel, with a brine solution at a second temperature, wherein the second temperature is greater than the first temperature, and wherein the brine solution comprises a vinegar-derived food additive and/or a reddening agent, wherein the reddening agent comprises nitrite; (c) agitating the body of meat at the second temperature for a time sufficient to distribute the solution throughout the body of meat; (d) cooling the body of meat in at least one cooling vessel to a third temperature, wherein the third temperature is less than the second temperature; (e) agitating the body of meat at the third temperature; (f) contacting the body of meat of step (e) with the brine solution at the third temperature and agitating the body of meat at the third temperature until the brine solution is substantially absorbed by the body of meat; and (g) recovering the body of meat in a dry state at the third temperature.

In one embodiment, the aforementioned brine solution comprises a vinegar-variety food additive, such as a vinegar-derived acetate composition. In another embodiment, the reddening agent comprises nitrate derived from plant material comprising nitrate. Other embodiments are described below.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Ratios, concentrations, amounts, and other numerical data may be expressed herein in a range format. Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. For illustration purposes only, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of food science, organic chemistry, biochemistry, molecular biology, and the like, which are within the skill of the art. Such techniques are explained fully in the literature.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated by reference as if fully set forth herein.

Prior to describing the various embodiments, the following definitions are provided and should be used unless otherwise indicated.

I. Definitions

Unless otherwise defined, all technical and scientific terms used herein have the same meaning as commonly understood by one of ordinary skill in the art of molecular biology. Although methods and materials similar or equivalent to those described herein can be used in the practice or testing of the present disclosure, suitable methods and materials are described herein.

The following terms have the meanings ascribed to them unless specified otherwise. In this disclosure:

As used herein, "food additive" refers to any substance safely added to food to preserve flavor, improve taste, or prolong shelf-life. Examples include, but are not limited to, food acids, acidity regulators, antimicrobials, buffering agents, buffer solutions, flavor enhancers, and preservatives.

As used herein, "buffering agent" or "buffering food additive" refers to any food additive safely added to food to adjust the pH of the food to which it is added. For example, buffering agents are usually either the weak acid or weak base component of a buffer solution, and their function is to drive an acidic or basic solution to a certain pH state or prevent its pH state from changing. Examples include, but are not limited to, aluminum potassium sulfate, sodium citrate, sodium acetate, and potassium acetate.

As used herein, "antimicrobial", "antimicrobial solution", or "antimicrobial food additive" refers to a food additive safely added to food to reduce the growth of or kill microbes. Examples include, but are not limited to, organic acids, such as lactic acid, citric acid, acetic acid, and their salts including, but not limited to, sodium acetate and potassium acetate. Examples of microbes include, but are not limited to, bacteria, viruses, fungi, and parasites.

As used herein, "pH" refers to a measure of acidity or basicity of a solution, as defined by the Henderson-Hasselbach equation: pH=pKa+log[concentration of compound in its acidic form]/[concentration of compound in its basic form].

As used herein, "basic neutralizing agent" refers to a base in solution with an acid resulting in neutralization. Examples of basic neutralizing agents include, but are not limited to, sodium bicarbonate, sodium carbonate, potassium bicarbonate, and the like.

As used herein, "meat" refers to edible flesh of animals that is acceptable for human consumption including, but not limited to, chicken, pork, beef, and fish. Most species of animal may be used as meat. Although, most meat consumed by humans is sourced from domesticated animals and aquatic species.

As used herein, the terms "preserving", "preserve(d)", "curing", and "cure(d)" refer to any improvement in the amount of time that meat or meat product treated with the curing agent can be safely stored (e.g., shelf-life), or remains sensory, organoleptic, or color-acceptable, when compared with meat or meat products that have not been cooked, cured, preserved, or treated with any shelf-life extending agent, such as salt or smoke.

II. Embodiments of the Present Disclosure

The present disclosure provides a method of processing meat resulting in consistently enhanced flavor and coloring and improved water retention, while preserving the meat by offering protection against antimicrobials.

In an embodiment, the present disclosure provides a method of processing meat comprising providing a body of meat at a first temperature; contacting the body of meat, in at least one treating vessel, with a brine solution at a second temperature, wherein the second temperature is greater than the first temperature, and wherein the brine solution comprises a vinegar-derived food additive and/or a reddening agent, wherein the reddening agent comprises nitrite; agitating the body of meat at a second temperature for a time sufficient to distribute the solution throughout the body of meat; cooling the body of meat in at least one cooling vessel to a third temperature, wherein the third temperature is less than the second temperature; agitating the body of meat at the third temperature; contacting the body of meat with the brine solution at the third temperature and agitating the body of meat at the third temperature until the brine solution is substantially absorbed by the body of meat; and recovering the body of meat in a dry state at the third temperature. In an embodiment, the body of meat is constantly agitated at the second and third temperatures. In a further embodiment, the second temperature is maintained substantially constant while the body of meat is agitated for a time sufficient to distribute the brine solution throughout the meat. For example, the temperature may be maintained at ±2° F.

In an embodiment, the brine solution of the present disclosure comprises a reddening agent comprising nitrite. In certain embodiments, the reddening agent of the present disclosure comprises nitrite derived from plant material comprising nitrate. The brine solution may further comprise salt, sugar, phosphate, water, and other additional ingredients such as the vinegar-derived food additive described below.

In certain embodiments, the reddening agent is allergen-free.

In certain embodiments, the reddening agent is derived from plant material including, but not limited to, *Apium gravelolens* Rapaceum Group (celery root); *Apium gravelolens* Vulce Group (celery stalks); *Beta vulgaris* (beet); *Brassica rapa* (broccoli/turnip); *Veronia calvoana* (bitterleaf); *Brassica oleracea* Gemmifera Group (Brussels sprouts, cabbage); *Eruca sativa* (rocket/arugula); *Brassica*

*oleracea* Capitata Group (cabbage); *Daucus carota* (carrot); *Brassica oleracea* Botrytis Group (cauliflower); *Brassica oleracea* Acephala Group (kale/collard greens); *Pastinaca sativa* (parsnip); *Allium cepa* (garden onion); *Allium ampeloprasum* (leek); *Allium sativum* (garlic); *Cucumis sativus* (cucumber); Solanum melongena (eggplant); *Solanum lycopersicum* (tomato); *Solanum tuberosum* (potato); *Lactuca sativa* (lettuce); *Cucurbitamaxima* (buttercup squash); *Cucurbita mixta* (cushaw squash); *Cucurbita moschata* (butternut squash); *Cucurbita pepo* (pumpkins/zucchini/acorn squash); *Raphanus sativus* (radish); *Cynara cardunculus* (artichoke); *Agaricus bisporus* (mushroom); *Phaseolus vulgaris* (common green bean); *Cichorium endivia* (endive); *Zea mays* (corn); *Abelmoschus esculentus* (okra); *Phaseolus lunatus* (lima bean); *Vigna unguiculata unguiculata* (black eyed pea); *Spinacia oleracea* (spinach); and combinations thereof.

In certain embodiments, the reddening agent is derived from plant material by contacting the plant material with an organism which converts nitrate in the plant material to nitrite. Organisms suitable for nitrate-to-nitrite reduction include, but are not limited to, any lactic acid bacteria, including in particular *S. carnosus, M. varians*, and combinations thereof. Specialized strains of *S. carnosus* may be utilized to derive greater amounts of nitrite from plant sources not traditionally used because of their lower nitrate content. Such a modification enables utilization of plant material not normally used as sources of natural nitrate.

Other organisms suitable for nitrate-to-nitrite reduction include, but are not limited to, organisms capable of nitrate-to-nitrite reduction, such as organisms possessing nitrate reductases or other enzymes which are able to convert nitrate to nitrite. Examples of these organisms also include, but are not limited to, *Paracoccus pantotrophus, E. coli, Haemophylus influenzae, Bacillus subtilis*, cyanobacteria, *Haloarcula, Thermus thermophilus, Synechococcus, Pseudomonas, Campylobacter jejunii, Wollinella succinogenes, Wautersia eutropha, Bradyrhizobium japonicum, Shewanella oneidensis, Rhodobacter capsulatus, Klebsiella pneumoniae, Haloferax, Desulfitobacterium hafniense, Streptococcus*, lactic acid bacteria, and combinations thereof.

In a further embodiment, the organism capable of converting the plant nitrate to nitrite is added to the mixture of the body of meat and a brine solution including the plant material after the body of meat is cooled and recovered in a dry state. The plant based nitrate and the organism for converting the plant based nitrate to nitrite are both provided in amounts sufficient to result in the production of nitrite in an amount effective to process or cure the body of meat.

The nitrite concentration of the reddening agent which contacts the body or meat or meat product can be any suitable concentration. The nitrite concentration of the reddening agent which contacts the body of meat or meat product can be at least about 10 ppm (e.g., at least about 30 ppm, at least about 50 ppm, at least about 75 ppm, at least about 100 ppm, or at least about 125 ppm). The nitrite concentration of the reddening agent which contacts the body of meat or meat product can be about 300 ppm or less (e.g., about 250 ppm or less, about 200 ppm or less, about 175 ppm or less, about 156 ppm or less, or about 125 ppm or less). The nitrite concentration of the reddening agent which contacts the body of meat or meat product can be, for example, about 10 ppm to about 300 ppm, about 20 ppm to about 275 ppm, about 30 ppm to about 250 ppm, about 40 ppm to about 220 ppm, or about 50 ppm to about 200 ppm.

In an exemplary embodiment, the amount of nitrite produced is preferably at least about 50 ppm nitrite.

In a series of reactions, nitrite may be converted to nitric oxide, which combines with myoglobin, the pigment responsible for the natural red color of uncured meat, to form nitric oxide myoglobin, producing a deep red color that changes to bright pink when heated, for example, by smoking. Accordingly, temperature can play a role in the reduction of nitric oxide myoglobin to form nitrosyl hemochrome for the formation of the red color associated with cured meat.

Furthermore, temperature is thought to enable the reddening of meat by allowing use of less nitrite than is needed in the absence of elevated temperature. In addition, vinegar and/or vinegar-derived food additive compositions are thought to increase the reduction of nitric oxide myoglobin to form nitrosyl hemochrome within meat. The vinegar and/or vinegar-derived food additive compositions also provide a tenderizing effect on meat and help maintain a buffered pH, which allows for the nitrite to nitric oxide reactions without denaturing meat proteins. Denaturing of proteins is generally evidenced by unwanted by-products such as lactic acid and other acids, causing further muscle decomposition due to the lowered pH.

In an embodiment, the method of processing meat provided by the present disclosure may further comprise heating the body of meat in a vessel prior to introduction into the treating vessel. In one embodiment, the body of meat is heated above ambient temperature prior to introduction into the treating vessel.

In an embodiment, the body of meat is heated by contact with a solution prior to introduction to the treating vessel.

In an embodiment, the second temperature may be about 45° F. to about 80° F., the third temperature may be about 25° F. to about 50° F., and the first temperature may be the same as the third temperature.

In certain embodiments, "contacting the body of meat with the brine solution" includes, but is not limited to contact by the following means: injection, massaging, tumbling, wetting, immersing, and the like. An exemplary treating vessel and an exemplary cooling vessel are described is U.S. Pat. No. 6,730,341. Other suitable equipment include, for example, the paddle massager described in U.S. Pat. No. 5,564,332, in which the pieces of meat can be subjected to a massaging action to distribute an aqueous solution, which has been injected into the meat, uniformly throughout the tissue thereof. Another patent disclosing such massaging is U.S. Pat. No. 5,405,630. An exemplary plant utilizing such a paddle massager and a maceration of the meat product before it enters the massager is described in U.S. Pat. No. 5,972,398. The meat may be injected with the aforementioned brine solution, usually with needles under an elevated pressure under conditions in which the meat is normally cold at the time it is injected and the injectable solution itself is relatively cold. It is desirable to conduct the massaging action so that the product emerges from the massager in a relatively dry state, i.e. the marinade or treating solution is fully taken up within the body of meat, leaving the surface free from or practically free from a liquid film. These techniques can be used for all sorts of meats, including beef, pork, lamb and veal, and practically any cut of meat in which a body of meat is desired to be processed or treated, for example, roasts, hams, shanks, loins and the like.

In certain embodiments, the vinegar-derived food additive composition comprises vinegar-derived sodium acetate. In an embodiment, the composition is in a powder form or in solution with vinegar.

In an embodiment, the vinegar-derived food additive composition comprises vinegar-derived potassium acetate. In an embodiment, the composition is in a powder form or in solution with vinegar.

In an embodiment, the vinegar-derived food additive composition is an antimicrobial food additive or buffering food additive having a pH of about 4.5 to a pH of about 10.0.

In an embodiment, the present disclosure provides a vinegar-derived food additive composition which is an antimicrobial food additive comprising a vinegar-derived acetate, such as sodium acetate or potassium acetate, and vinegar and has a pH of about 4.5 to 7.0. The antimicrobial food additive is produced by treating vinegar with a basic neutralizing agent, such as sodium bicarbonate, sodium carbonate, or potassium bicarbonate, to produce a partially-neutralized vinegar with a pH of below about 7.0. The partially neutralized vinegar is dried, such as by evaporation and heat, to produce an acetate, such as sodium acetate or potassium acetate. In an embodiment, vinegar can be added back to the acetate to produce an antimicrobial food additive solution having a pH of about 4.5 to about 7.0.

In an embodiment, the present disclosure provides a vinegar-derived food additive composition which is a buffering food additive comprising vinegar-derived acetate, such as sodium acetate or potassium acetate, and vinegar and has a pH of about 7.0 to about 10.0. The buffering food additive is produced by treating vinegar with a basic neutralizing agent, such as sodium bicarbonate, sodium carbonate, or potassium bicarbonate, to produce a partially-neutralized vinegar with a pH of below about 7.0. The partially neutralized vinegar is dried, such as by evaporation and heat, to produce an acetate, such as sodium acetate or potassium acetate. Vinegar is added back to the acetate to produce a buffering food additive having a pH of about 7.0 to about 10.0.

In an embodiment, the present disclosure also provides a method of preparing a food additive from vinegar comprising:
(a) treating vinegar with a basic neutralizing agent (e.g. sodium bicarbonate, sodium carbonate, or potassium bicarbonate) to partially neutralize the vinegar to a pH of below about 7.0; and
(b) evaporating water from and drying the product of step (a) to produce a an acetate (e.g. sodium acetate or potassium acetate).

In an embodiment, the method of preparing a food additive from vinegar further comprises:
(c) adding vinegar to the acetate of step (b) to produce a vinegar-acetate dry powder or solution having a pH of about 4.5 to a pH of about 10.0.

In an embodiment, the amount of basic neutralizing agent necessary to partially neutralize the vinegar is in the range of about 3.5 pounds to about 5 pounds per about 10 pounds of vinegar.

In an embodiment, the food additive prepared from vinegar can be an antimicrobial food additive or buffer solution. The basic neutralizing agent of step (a) can be sodium bicarbonate, sodium carbonate, or potassium bicarbonate. A sufficient amount of vinegar added in step (c) can result in an antimicrobial food additive having a pH of about 4.5 to a pH of about 7.0 or result in a buffer solution having a pH of about 7.0 to about 10.0.

The vinegar-derived food additive and/or reddening agent of the present disclosure can be used to process any of a wide variety of meat or meat product that it is desired to process. For example, uncured meat or meat product that can be processed with the additive and/or agent of the present disclosure include, but are not limited to, whole muscle meats, emulsified meats, and the like. Cured meat or meat products include, for example, ham, turkey, chicken, hot dogs, lunch meat, bacon and the like.

Although preferred embodiments of the present disclosure have been described using specific terms, devices, and methods, such description is for illustrative purposes only. The words used are words of description rather than words of limitation. Changes and variations may be made by those of ordinary skill in the art without departing from the spirit or the scope of the present disclosure, which is set forth in the appended claims. In addition, aspects of the various embodiments may be interchanged, in whole or in part. The present disclosure is further illustrated by the following examples, which are provided by way of illustration and are not meant to be construed as limiting. The contents of all references, published patents, and patents cited throughout the present application are also hereby incorporated by reference in their entireties.

The invention claimed is:

1. A method of producing a dry powder vinegar-derived food additive, comprising:
(a) treating vinegar with a basic neutralizing agent to reduce the acidity of the vinegar;
(b) drying the product of step (a) to produce a dry powder; and
(c) adding vinegar to the product of step (b) to produce a dry powder.

2. The method of claim 1, wherein step (a) neutralizes the vinegar to a pH of below about 7.0.

3. The method of claim 1, wherein step (a) neutralizes the vinegar to a pH of about 7.0.

4. The method of claim 1, wherein step (a) neutralizes the vinegar to a pH of above about 7.0.

5. The method of claim 1, wherein step (a) neutralizes the vinegar to a pH of about 4.5 to about 10.0.

6. The method of claim 5, wherein step (a) neutralizes the vinegar to a pH of about 4.5 to below about 7.0.

7. The method of claim 5, wherein step (a) neutralizes the vinegar to a pH of about 7.0 to about 10.0.

8. The method of claim 1, wherein, in step (a), the basic neutralizing agent is selected from the group consisting of: sodium, potassium, calcium, magnesium, and ammonium hydroxide, carbonate, and bicarbonate.

9. The method of claim 8, wherein, in step (a), the basic neutralizing agent is selected from the group consisting of: sodium bicarbonate, sodium carbonate, and potassium carbonate.

10. The method of claim 1, wherein, in step (b), the dry powder comprises a vinegar-derived acetate selected from the group consisting of: sodium acetate, potassium acetate, calcium acetate, magnesium acetate, and ammonium acetate.

11. The method of claim 10, wherein, in step (b), the dry powder comprises a vinegar-derived acetate selected from the group consisting of: sodium acetate and potassium acetate.

12. The method of claim 1, wherein, in step (b), drying the product of step (a) comprises: removing water from the product of step (a) by evaporation.

13. The method of claim 1, wherein, in step (c), adding vinegar to the product of step (b) comprises: adding unneutralized vinegar to the product of step (b).

14. The method of claim 1, wherein, in step (c), the dry powder comprises a vinegar derived acetate and a vinegar-derived acetic acid in a form of a dry powder having a pH of about 4.5 to about 7.0.

15. A method of producing a dry powder vinegar-derived food additive, comprising:
   (a) drying a mixture of a basic neutralizing agent and a molar excess of vinegar, thereby forming a dry powder comprising a vinegar-derived acetate and an acetic acid; and
   (b) adding vinegar to the product of step (a), thereby reducing the pH of the dry powder.

16. The method of claim 15, wherein, in step (a), the basic neutralizing agent is selected from the group consisting of: sodium, potassium, calcium, magnesium, and ammonium hydroxide, carbonate, and bicarbonate.

17. The method of claim 16, wherein, in step (a), the basic neutralizing agent is selected from the group consisting of: sodium bicarbonate, sodium carbonate, and potassium carbonate.

18. The method of claim 15, wherein, in step (a), step (b), or both, the dry powder comprises a vinegar-derived acetate selected from the group consisting of: sodium acetate, potassium acetate, calcium acetate, magnesium acetate, and ammonium acetate.

19. The method of claim 18, wherein, in step (a), step (b), or both, the dry powder comprises a vinegar-derived acetate selected from the group consisting of: sodium acetate and potassium acetate.

20. The method of claim 15, wherein, in step (a), drying the mixture of a basic neutralizing agent and a molar excess of vinegar comprises: removing water from the mixture by evaporation.

21. The method of claim 15, wherein, in step (b), adding vinegar to the product of step (a) comprises: adding unneutralized vinegar to the product of step (a).

22. The method of claim 15, wherein, in step (a), step (b), or both, the dry powder has a pH of below about 7.0, about 7.0, or above 7.0.

23. A method of producing a dry powder vinegar-derived food additive, comprising:
   (a) drying a reacted mixture of a basic neutralizing agent and vinegar; and
   (b) adding vinegar to the dried reacted mixture of step (a) to form a dry powder comprising a vinegar-derived acetate and an acetic acid.

24. The method of claim 23, wherein the basic neutralizing agent is selected from the group consisting of: sodium, potassium, calcium, magnesium, and ammonium hydroxide, carbonate, and bicarbonate.

25. The method of claim 24, wherein the basic neutralizing agent is selected from the group consisting of: sodium bicarbonate, sodium carbonate, and potassium carbonate.

26. The method of claim 23, wherein the vinegar-derived acetate is selected from the group consisting of: sodium acetate, potassium acetate, calcium acetate, magnesium acetate, and ammonium acetate.

27. The method of claim 26, wherein the vinegar-derived acetate is selected from the group consisting of: sodium acetate and potassium acetate.

28. The method of claim 23, wherein drying the reacted mixture comprises:
   removing water from the reacted mixture by evaporation.

29. The method of claim 23, wherein the dry powder has a pH of from about 4.5 to about 10.0.

30. A method of producing a dry powder vinegar-derived food additive, comprising:
   (a) treating vinegar with a basic neutralizing agent to reduce the acidity of the vinegar;
   (b) evaporating water from the product of step (a) to produce a product comprising a vinegar-derived acetate; and
   (c) adding vinegar to the product of step (b) to produce a dry powder.

* * * * *